United States Patent [19]
Alford et al.

[11] Patent Number: 4,687,534
[45] Date of Patent: Aug. 18, 1987

[54] PROCESS OF MAKING A FILM FACED EXPANDED POLYSTYRENE FOAM BOARD

[75] Inventors: Robert A. Alford, Sparta; Mark C. Braemer, Mercerville, both of N.J.

[73] Assignee: BASF Corporation, Parsippany, N.J.

[21] Appl. No.: 745,200

[22] Filed: Jun. 17, 1985

[51] Int. Cl.⁴ .................................................. C09J 5/02
[52] U.S. Cl. .............................. 156/308.6; 156/308.2; 156/334; 428/317.7; 428/319.9
[58] Field of Search .................. 156/308.2, 308.6, 334; 428/314.4, 317.1, 317.7, 319.9

[56] References Cited

U.S. PATENT DOCUMENTS

| | | | |
|---|---|---|---|
| 3,619,344 | 11/1971 | Wolinski et al. | 428/314.4 |
| 3,637,459 | 1/1972 | Parish et al. | 428/317.1 |
| 3,823,047 | 7/1974 | Colombo | 428/314.4 X |
| 4,097,629 | 6/1978 | Schneider | 428/317.1 X |
| 4,330,352 | 5/1982 | Grimes et al. | 528/40 X |
| 4,425,396 | 1/1984 | Hartman | 428/314.4 X |
| 4,440,911 | 4/1984 | Inoue et al. | 525/301 |
| 4,487,885 | 12/1984 | Adur et al. | 525/78 X |

Primary Examiner—Robert A. Dawson
Attorney, Agent, or Firm—Norbert M. Lisicki

[57] ABSTRACT

Film faced expanded polystyrene foam board is prepared by heat laminating expanded polystyrene board with a film composition comprising a high density polyethylene film layer and a heat activated low density adhesive film layer. This board is useful in the construction industry.

10 Claims, No Drawings

PROCESS OF MAKING A FILM FACED EXPANDED POLYSTYRENE FOAM BOARD

This invention is directed to an insulation board useful in the construction industry. More particularly, the insulation board is one which is composed of a film faced expanded polystyrene foam board. Because of increased resistance to moisture effects and improved flexural characteristics, film faced expanded polystyrene board may be used in applications where an improved resistance to deterioration by contact with ultra violet radiation, heat, ice, soil, water, moisture vapor, chemical solvents and/or rough handling is desirable. Employing a film faced expanded polystyrene board having two film faces offers a built-in vapor barrier with the inner facing while the outerfacing provides solvent resistance, a combination that is particularly important in many roof applications. Loosely laid and ballasted roof membranes normally require a rather extensive use of solvents for lap joint cleaning and sealing and these solvents are known to damage polystyrene in spite of the best effort to control carefully the workmanship on the job. Additionally, the currently employed foilized kraft paper faced expanded polystyrene board is not suitable for use below grade as a foundation insulation. It is subject to moisture induced delamintion on the jobsite. It has been found that certain film faced expanded polystyrene foam board may be useful both below and above grade as insulation material.

SUMMARY OF THE INVENTION

The present invention is directed to a film faced expanded polystyrene foam board. This film faced expanded polystyrene foam board may be used as foundation insulation, sub-floor insulation, wall insulation and roofing insulation.

Specifically the present invention is a preformed board structure composed of an expanded polystyrene foam board which has been coated with a film composition, which film composition comprises a first heat activated adhesive film layer which laminates a second film layer to the expanded polystyrene foam.

DESCRIPTION OF THE PREFERRED EMBODIMENT

The instant invention is directed to an expanded polystyrene board having at least one surface coated with a heat laminated plastic film which film is attached to the expanded polystyrene board employing a process comprising covering the surface of the expanded polystyrene board with a film composition which film composition comprises a first heat activated film layer having a suitable melt index such that the first layer of low density polyethylene will laminate to the surface of the expanded polystyrene foam board without appreciably distorting the surface of the board and thus enables a second film layer of high density polyethylene to be laminated to the expanded polystyrene board. More specifically, the first film layer is composed of an acrylic modified low density polyethylene film. The second film layer is an alkene modified high density polyethylene film. The low density polyethylene film may be modified employing a copolymer of an acidic co-monomer selected from alpha-beta ethylenically unsaturated mono and polycarboxylic acids and acid anhydrides having from 3 to 8 carbon atoms per molecule and partial esters of such polycarboxylic acids wherein the acid moiety has at least one carboxyl group and the alcohol moiety has from 1 to 20 carbon atoms. These acidic co-monomers are selected from the group consisting of acrylic acid, methacrylic acid, crotonic acid, fumaric acid, maleic acid, maleic anhydride, monomethylmaleate, monoethylmaleate, monomethylfumarate, and monoethylfumarate. Preferably the co-monomer is methylacrylate in a concentration range of about 10 percent to 25 percent of the total polyethylene plus methyacrylate. The second film layer is composed of high density polyethylene which has been copolymerized with a co-monomer of an alkene containing from 3 to 18 carbon atoms preferably from 3 to 10 carbon atoms. The concentration of alkene which may be empolyed ranges from about 2 percent to about 15 percent. The process which is employed for preparing the film faced expanded polystyrene foam board is one which employs an extruded dual film of low density and high density polyethylene. This is accomplished by using double bubble technique wherein the low density polyethylene is extruded simultaneously with the high density polyethylene forming one film layer. The thickness of the film layer can vary anywhere from one half of a mil to as much as ten mils, however, it is preferable that film thicknesses of about one mil be employed. It is further preferred that the relative ratio of low density polyethylene to high density polyethylene vary no more than from 2 to 1 to 1 to 20. The thickness of the inner layer is such that an adequate bond will form with the expanded polystyrene. The outer layer can vary in thickness depending on the ultimate use of the film faced board. More preferably however, the relative ratio of low density to high density polyethylene film is 1 to 1. If desired, the expanded polystyrene foam board may be film faced either on one side or on both sides of the board or even on all sides and edges of a particular piece of board. Additionally, it is contemplated that if desired, one or more surfaces of the film faced expanded polystyrene foam board may be metallized. If desired, the metallized layer may be placed opon the film prior to the time that the film facing is being attached to the expanded polystyrene foam board. This metallization may be composed of a deposit of aluminum particles or a film of aluminum. The film may have a metal colorant or can be vacuum metallized. Metallization can also occur by spraycoating the film or the foam board. It is contemplated that the expanded polystyrene foam board may be film faced by placing a double bubble blown film comprising an inner layer of low density polyethylene film modified with methylacrylate and then an alternate layer of a high density polyethylene film modified with an alkene by heating the film facing layer in such a manner that the outer layer is held to a maximum temperature below its melting point and about 121° C. and the more heat susceptible inner layer is brought to a temperature near or slightly above its softening point until tacky. It follows that the film is placed in contact with the expanded polystyrene foam board at a pressure sufficient to compress the expanded polystyrene foam board about 1 percent to 50 percent (may vary with thickness and foam density) for about one second or more until the inner film layer bonds to the expanded polystyrene foam board. The film layer may be applied using heated presses or oscillating plates, however, it is preferable to use uniformly heated rollers to apply the film to the foam board. If desired, a metallic, metallized or colored film may be employed for the outer layer. It is important to this invention that the heat transfer to the foam board during lamination be sufficiently low to preclude excessive permanent deformation of the heat susceptible expanded polystyrene foam board and yet sufficiently high to facilitate good adhesion of the film outer layer to the expanded polystyrene foam board.

It is well known that the expanded polystyrene is a thermoplastic material of low density and subject to heat distortion under minor intermittent heated load at a condition of about 82° C. and 1 psi. While it may be possible to heat laminate a variety of thermoplastic films to the expanded polystyrene foam board, the prepared facing for the film faced expanded polystyrene board exhibits suitable elongation, tear strength and solvent resistance properties employing thin guages, i.e., 1 mil, and wide width, i.e., two to eight feet of film. A characteristic of the invention is the resistance to delamination under flexing, temperature cycling, surface contact to solvents and both liquid and vapor water exposure. Additional characteristics of the invention include modifications in physical properties of the foam board due to the presence of the film facings. These physical property modifications are a reduction in the water vapor transmission rate, a reduction in the thermal conductivity per unit of thickness and an increased yield point upon flexural loading of the board.

The following examples are intended to exemplify the invention.

EXAMPLE 1

A double-bubble blown film comprising an inner layer of low density polyethylene film which was modified with about 17 percent methyl acrylate and having a thickness of about 0.5 mils and an outer layer of high density polyethylene modified with about 10 percent octene having a thickness of about 0.5 mils was extruded and pressed unto a moving line of expanded polystyrene board stock with a roller heated to about 121° C. The film was bonded very well to the board stock.

EXAMPLES 2-3

A board stock of film faced polystyrene prepared as shown in Example 1 with film on each face of the board was tested for water absorption employing ASTM Test C 272 and Modified D2842. The board was constructed of expanded polystyrene having a nominal density of 16.02 kilograms per cubic meter. This was compared to a sample of the same expanded polystyrene board which was not film faced as in Example 3.

|  | % Volume Absorbed | |
| --- | --- | --- |
|  | ASTM C272 | ASTM D2842 |
| Example 2 | 0.047 | 0.82 |
| Example 3 | 2.5 | 5.5 |

EXAMPLES 4-7

|  | Flexural Strength (kPa) | Yield at Break (mm) |
| --- | --- | --- |
| Example 4 | 154 | >89 |
| Example 5 | 173 | >89 |
| Example 6 | 203 | >89 |
| Example 7 | 137 | ≳38 |

Examples 4, 5, and 6 were film faced employing the procedure of Example 1 with 1, 2, and 3 mil thickness film for Examples 4, 5, and 6 respectively with equal proportions of high and low density polyethylene. The test employed was ASTM method C203 and 14.4 kilogram/meter$^3$ samples of expanded polystyrene board. Example 7 was a sample of the same polystyrene board with no film facing.

EXAMPLES 8-9

|  | Examples | |
| --- | --- | --- |
|  | 8 | 9 |
| Thermal Conductivity | mw meter-°K. | mw meter-°K. |
| k-value @ 24° C. 12.5 cm thickness | .038 | .036 |
| k-value @ 24° C. 25 cm thickness | .039 | .038 |
| k-value @ 24° C. 50 cm thickness | .042 | .040 |

Example 8 employed molded polystyrene board without film. Example 9 employed a board faced with film on both sides. The film was prepared employing the process of Example 1 except that the outer surfaces were metallized. The test employed was ASTM Method C518 with a temperature difference across the specimen of 10° C.

EXAMPLES 10 and 11

| Example | 10 | 11 |
| --- | --- | --- |
| Application of 1 cc of gasoline to board surface | No damage | Foam dissolved |
| Application of 1 cc of paint thinner to board surface | No damage | Foam dissolved |

Example 10 employed film faced polystyrene board of the invention employing the process of Example 1. Example 11 employed polystyrene without film.

COMPARISON EXAMPLE A

Using the process of Example 1, a film of polystyrene was pressed into a moving line of expanded polystyrene board stock with a roller heated at about 121° C. The resulting facing distorted and shrunk, and only an intermittent bond was formed between the film and the board.

COMPARISON EXAMPLE B

Using the process of Example 1, a film of high density polyethylene was pressed unto a moving line of expanded polystyrene board stock with a roller heated at about 121° C. The board stock shrunk, and no bond was formed with the film.

COMPARISON EXAMPLE C

Using the process of Example 1, a film of coextruded high density polyethylene with an inner layer of low density polyethylene modified with vinyl acetate was pressed unto a moving line of expanded polystyrene board stock with a roller heated at about 121° C. The film was poorly bonded and was easily delaminated.

COMPARISON EXAMPLE D

Using the process of Example 1, a film of coextruded high density polyethylene with an inner layer of low density polyethylene modified with acrylic acid was pressed into a moving line of expanded polystyrene board stock with a roller heated at about 121° C. The film was poorly bonded and was easily delaminated.

The embodiments of the invention in which an exclusive privilege or property is claimed are defined as follows:

1. A process for producing an expanded polystyrene article having at least one surface coated with a heat laminated plastic film comprising laminating at least one surface of said article with a film composition comprising a double bubble of a high density film layer and a heat activated adhesive film layer, said adhesive film layer having a suitable melt index to adhere the high density film layer to said polystyrene article.

2. The process of claim 1 wherein the adhesive layer is an acrylic modified low density polyethylene.

3. The process of claim 1 wherein the second layer is an alkene modified high density polyethylene said alkene containing from 3 to 10 carbon atoms.

4. The process of claim 2 wherein low density polyethylene is modified with methyl acrylate.

5. The process of claim 4 wherein the concentration of methyl acrylate is from about 10 percent to about 25 percent.

6. The process of claim 3 wherein said alkene is octene.

7. The process of claim 4 wherein the concentration of said octene is from about 2 percent to about 15 percent.

8. A process for reducing the thermal conductivity of an expanded polystyrene foam board wherein a metallized polyethylene film facing is heat laminated unto said polystyrene foam board wherein said board has at least one surface coated with a heat laminated plastic film comprising a double bubble of a high density film layer and a heat activated adhesive film layer, said adhesive film layer having a suitable melt index to adhere the high density film layer to said polystyrene article.

9. A process for increasing the solvent resistance of an expanded polystyrene foam board wherein a solvent resistant polyethylene film is heat laminated unto said polystyrene board wherein said board has at least one surface coated with a heat laminated plastic film comprising a double bubble of a high density film layer and a heat activated adhesive film layer, said adhesive film layer having a suitable melt index to adhere the high density film layer to said polystyrene article.

10. A process for increasing the flexural loading yield point an expanded polystyrene foam board wherein a high elongation polyethylene film is heat laminated unto said polystyrene foam board wherein said board has at least one surface coated with a heat laminated plastic film comprising a double bubble of a high density film layer and a heat activated adhesive film layer, said adhesive film layer having a suitable melt index to adhere the high density film layer to said polystyrene article.

* * * * *